(12) United States Patent
Nakakubo

(10) Patent No.: US 8,026,009 B2
(45) Date of Patent: Sep. 27, 2011

(54) EXHAUST FUEL DILUTING MECHANISM AND FUEL CELL SYSTEM WITH THE EXHAUST FUEL DILUTING MECHANISM

(75) Inventor: Toru Nakakubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 12/281,133

(22) PCT Filed: Oct. 12, 2007

(86) PCT No.: PCT/JP2007/070394
§ 371 (c)(1),
(2), (4) Date: Aug. 28, 2008

(87) PCT Pub. No.: WO2008/047887
PCT Pub. Date: Apr. 24, 2008

(65) Prior Publication Data
US 2009/0197141 A1   Aug. 6, 2009

(30) Foreign Application Priority Data

Oct. 17, 2006   (JP) .................. 2006-282183

(51) Int. Cl.
*H01M 8/06* (2006.01)
*H01M 8/00* (2006.01)
(52) U.S. Cl. .................. 429/408; 429/415; 429/535
(58) Field of Classification Search .................. None
See application file for complete search history.

(56) References Cited

U.S. PATENT DOCUMENTS

| | | | | |
|---|---|---|---|---|
| 3,273,161 A * | 9/1966 | Di Giorgio | .................. | 123/557 |
| 5,421,719 A * | 6/1995 | Saito et al. | .................. | 431/7 |
| 6,033,793 A * | 3/2000 | Woods et al. | .................. | 429/410 |
| 6,777,123 B2 * | 8/2004 | Okamoto | .................. | 429/416 |
| 6,916,563 B2 | 7/2005 | Yamamoto et al. | | |
| 7,077,161 B2 * | 7/2006 | Sasaki et al. | .................. | 137/613 |
| 7,118,823 B2 | 10/2006 | Kato et al. | | |
| 7,291,411 B2 * | 11/2007 | Pettit et al. | .................. | 429/441 |
| 2003/0059729 A1 * | 3/2003 | Autenrieth | .................. | 431/11 |
| 2003/0190505 A1 * | 10/2003 | Kearl et al. | .................. | 429/19 |
| 2005/0118471 A1 | 6/2005 | Fukuma et al. | | |
| 2006/0040158 A1 | 2/2006 | Numata et al. | | |
| 2006/0141311 A1 * | 6/2006 | Tang et al. | .................. | 429/26 |
| 2006/0263658 A1 | 11/2006 | Yanagi et al. | | |

(Continued)

FOREIGN PATENT DOCUMENTS

CN    1622379 A    6/2005

(Continued)

*Primary Examiner* — Barbara Gilliam
*Assistant Examiner* — Kwang Han
(74) *Attorney, Agent, or Firm* — Fitzpatrick, Cella, Harper & Scinto

(57) ABSTRACT

There is provided a diluting mechanism for an exhaust fuel including: a fuel inlet provided for supplying the exhaust fuel that is exhausted from the device using the fuel to the dilution chamber; a diluent inlet provided for supplying a diluent to the dilution chamber; a diffusion flow path provided in the dilution chamber for mixing the exhaust fuel that is supplied from the fuel inlet with the diluent that is supplied from the diluent inlet; a fuel exhaust port for exhausting the diluted exhaust fuel out of the dilution chamber through the diffusion flow path; and a nozzle that narrows a flow path, provided at the fuel inlet, in which the nozzle limits a supply quantity of the exhaust fuel to the dilution chamber.

18 Claims, 11 Drawing Sheets

U.S. PATENT DOCUMENTS

2007/0122667 A1* 5/2007 Kelley ........................... 429/19
2007/0251452 A1 11/2007 Tanaka et al.

FOREIGN PATENT DOCUMENTS

| | | | |
|---|---|---|---|
| JP | 2002-343391 A | 11/2002 |
| JP | 2003-132915 A | 5/2003 |
| JP | 2004-006183 A | 1/2004 |
| JP | 2004-031199 A | 1/2004 |
| JP | 2004-171967 A | 6/2004 |
| JP | 2004-360061 A | 12/2004 |
| JP | 2005-011641 A | 1/2005 |
| JP | 2005-108805 A | 4/2005 |
| JP | 2006-031998 A | 2/2006 |
| JP | 2006-156053 A | 6/2006 |
| JP | 2006-183977 A | 7/2006 |
| JP | 2007-018857 A | 1/2007 |

* cited by examiner

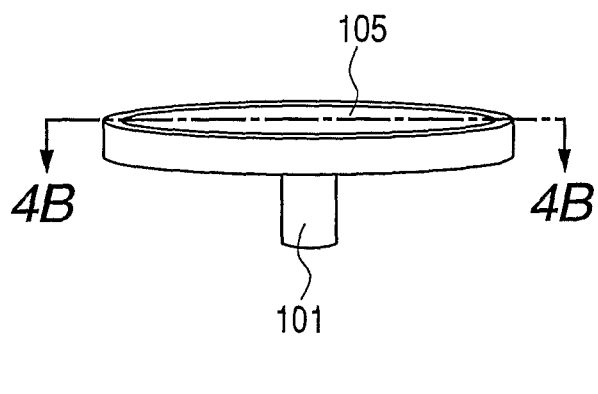
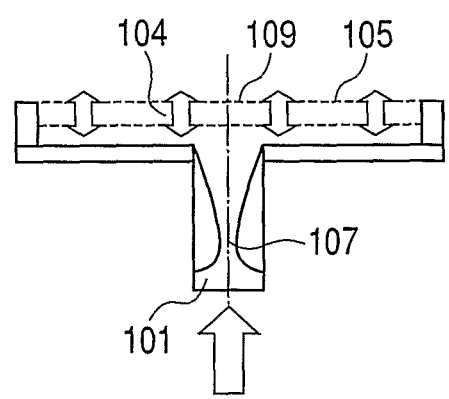
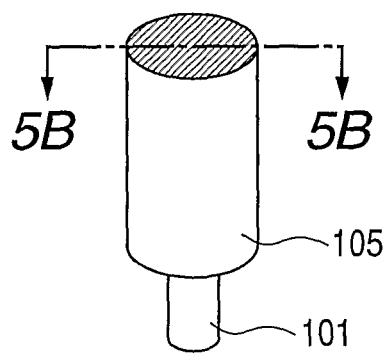
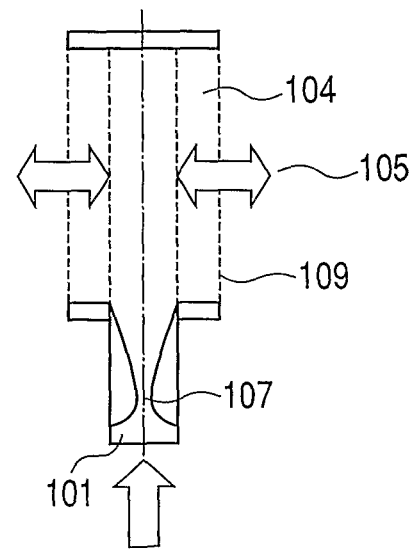

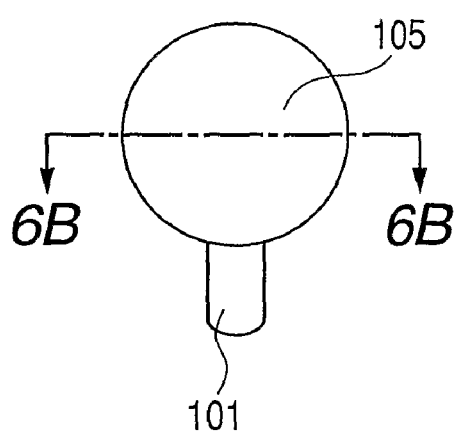
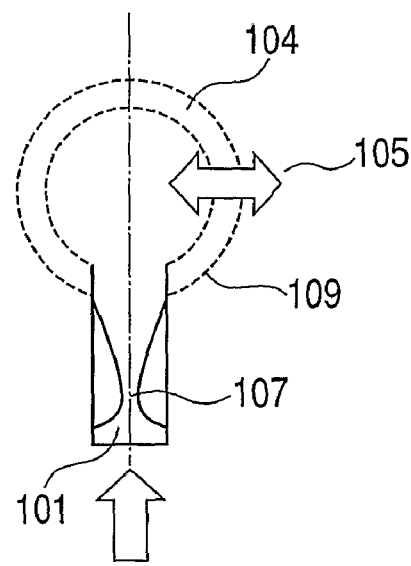
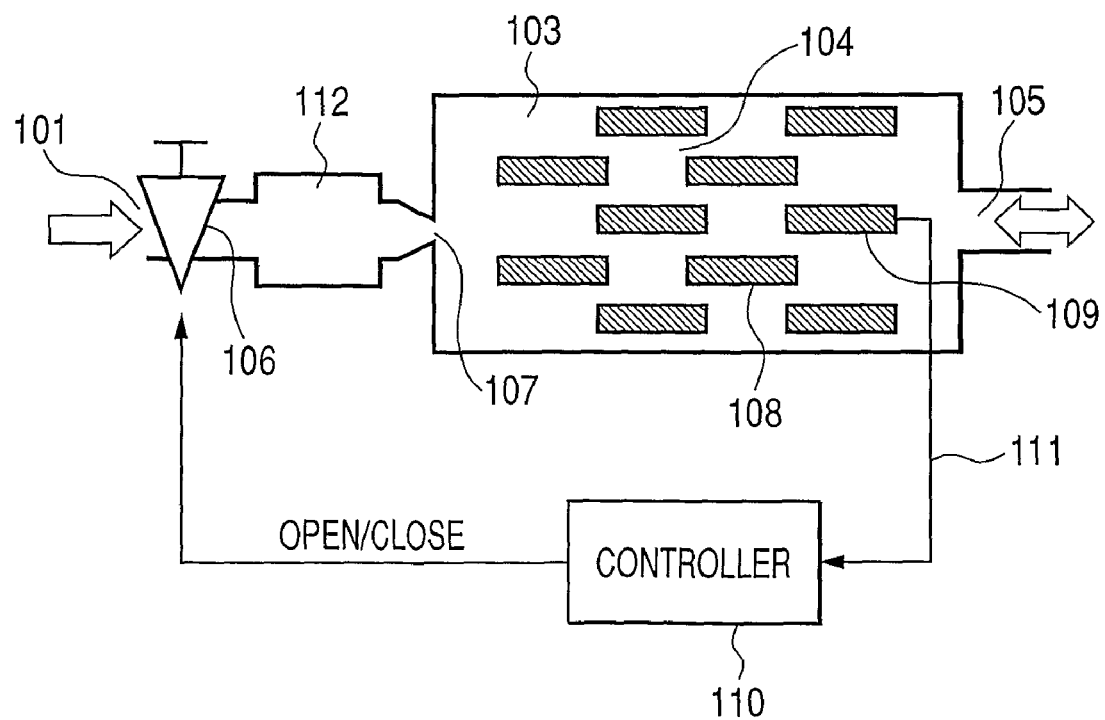

EXHAUST FUEL DILUTING MECHANISM AND FUEL CELL SYSTEM WITH THE EXHAUST FUEL DILUTING MECHANISM

TECHNICAL FIELD

The present invention relates to an exhaust fuel diluting mechanism and a fuel cell system with the exhaust fuel diluting mechanism, and particularly to a diluting mechanism for a fuel that is exhausted at the time of purging a small-sized fuel cell that is mounted in a small-sized electric device.

BACKGROUND ART

Up to now, diverse types of fuel cells have been researched and developed.

Among those fuel cells, a polymer electrolyte fuel cell has been extensively researched and developed as an on-vehicle or household generating equipment for the reason that the polymer electrolyte fuel cell is easily handled because an operating temperature is relatively low, and an electrolyte is formed of a polymer membrane.

On the other hand, for the purpose of carrying on a small-sized electric equipment in use, diverse primary batteries and secondary batteries have been employed. However, with increasing performance of the recent small-sized electric equipment, a power consumption is increased, and the primary battery that is small in size and light in weight is incapable of supplying a sufficient energy.

Also, the secondary battery is advantageous in that the secondary battery can be repetitively charged in use, but an available energy that can be charged by one charging is still smaller than that of the primary battery.

In order to charge the secondary battery, another power source is required, and it normally takes several tens minutes to several hours to charge the secondary battery. Thus, it is difficult to enable the secondary battery to be soon used anytime and anywhere.

In the future, the electric equipments are increasingly reduced in size and weight, and the wireless network environments are prepared, so there is an increasing tendency to carry on the equipment in use. However, the conventional primary cells and secondary cells are difficult to supply the sufficient energy for driving the equipments.

In order to solve the above problem, attention has been paid to the small-sized fuel cell. This is because the available energy quantity per volume or per weight is several times to ten times as large as that of the conventional fuel cell on the ground that the fuel cell is valuable to the driving source of the small-sized electric device.

In addition, because the small-sized fuel cell can be continuously used by exchanging only a fuel, it takes no time for charging unlike in the case of the secondary battery. The small-sized fuel cells that are mainly used are of the polymer electrolyte type or the direct methanol type.

In the polymer electrolyte fuel cell, a polymer electrolyte membrane is used as the electrolyte, and a membrane electrode assembly has catalyst electrode layers on both sides thereof. A fuel (hydrogen) is supplied to one of the catalyst electrode layers (anode), and an oxidizer (air) is supplied to another catalyst electrode layer (cathode) to conduct power generation.

In this case, water is generated as a product.

Reaction formulas at the anode and the cathode are represented as follows.

Anode: 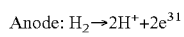

Cathode: 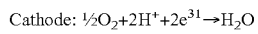

The theoretical voltage of a pair of membrane electrode assembly is about 1.23 V, but in many cases, the voltage is about 0.7 V in a normal operating state.

For that reason, when higher voltage is required or higher output density is required, a plurality of fuel cell units are laminated, and the respective fuel cell units are electrically connected in series with each other in many cases.

The above laminated structure is called "fuel cell stack", and in general, an anode flow path and a cathode flow path are isolated from each other by a member that is called "separator."

In the following description of the present invention, the fuel flow paths denote flow paths in which the fuel that is supplied from a fuel container circulates within the fuel cell system.

That is, the fuel flow paths denote a flow path for guiding the fuel from the fuel container to the fuel cell, a flow path for supplying the fuel to the anode in the fuel cell, a flow path that is provided in the anode, and a flow path that extends up to a exhaust mechanism for exhausting the fuel within the fuel cell from the fuel cell to the external.

In particular, the flow path within the anode is called "anode flow path," or merely "anode."

During the power generation of the fuel cell, impurity gas, which is attributable to the power generation, such as nitrogen in the air or the generated moisture vapor is gradually stored within the fuel flow path, because the electrolyte membrane that is used in the polymer electrolyte fuel cell penetrates a slight amount of air.

In particular, in the fuel cell of the circulation type or the dead end type which is high in the fuel utilization rate, the power generation characteristics of the fuel cell are deteriorated by the aid of the stored impurity gas.

For that reason, Japanese Patent Application Laid-Open No. 2004-171967 discloses the fuel cell of the dead end type in which a purge valve is provided in the fuel flow path, and the purge operation is conducted during the power generation to prevent the characteristics from being deteriorated.

The purge operation is the operation of purging the impurity gas by the aid of the fuel gas. For that reason, not only the impurity gas but also the fuel gas is contained in the exhaust gas.

In a case of using hydrogen as the fuel, attention is paid so that the ratio of fuel to air does not fall within 4 to 75%.

Under the circumstances, in Japanese Patent Application Laid-Open No. 2003-132915, the following proposal is made in order to dilute the exhaust fuel to a concentration other than the above range.

In Japanese Patent Application Laid-Open No. 2003-132915, there is proposed, the fuel cell system in which the purged fuel gas is diluted by the aid of a cathode off gas that is exhausted from the fuel cell within a diluter.

Also, in Japanese Patent Application Laid-Open No. 2005-108805, there is proposed that the fuel gas is mixed with the cathode off gas and is burned using the catalyst, to thereby exhaust the fuel gas after dilution.

In the catalytic combustion system of the above type, in particular, it is necessary to stably maintain a blaze when the fuel gas is diluted by combustion.

In order to meet the above requirement, in Japanese Patent Application Laid-Open No. 2006-183977, there is proposed that a volume chamber that acts as a buffer is provided in front of a combustion chamber to accumulate the purge gas, to thereby supply a given quantity of fuel to the combustion chamber through intermittent purge operation.

Also, Japanese Patent Application Laid-Open No. 2006-183977 discloses a catalyst combustion chamber in which a current plate that supplies a pressure loss to the mixture gas is provided to the upstream side of a combustion portion in order to sufficiently mix the fuel with an oxidizer. In addition, the current plate has a flow path diameter that is equal to or less than a quenching diameter of the fuel, to thereby prevent the blaze within the combustion chamber from being transmitted upstream.

In general, the ratio of the surface area to the volume is large in a fine space, and a heat is easily escaped. Accordingly, an area where the blaze cannot be maintained in the mixture blaze within the fine space because the combustion heat is liable to be taken by an outer wall. This phenomenon is called "quenching phenomenon." For example, when an interval between the two parallel walls becomes equal to or less than a given distance, the blaze cannot be propagated. The limit value is called "quenching distance," and also "quenching diameter" in a case where the flow path is a circular tube. The quenching distance and the quenching diameter are different depending on the gas, for example, the quenching distance of hydrogen is 0.51 mm. Accordingly, in order to stably maintain the blaze, a space that is equal to or more than the quenching distance is required. Conversely, in order to prevent the flashback, a filter (quenching filter) having a filter diameter which is equal to or less than the quenching diameter is used.

However, the above-mentioned conventional diluter for diluting the exhaust fuel to the concentration other than the above range has the following problems.

For example, in the above conventional fuel cell system disclosed in Japanese Patent Application Laid-Open No. 2003-132915, it is difficult to obtain a sufficient flow rate in a natural diffusion because the cathode off gas that is supplied by a pump or a blower is used for dilution.

Also, in order to control the fuel gas flow rate, because the flow rate control valve and a circuit for controlling the flow rate control valve are required, the volume becomes large, and an electric power for control is required.

Also, in the above conventional fuel cell systems disclosed in Japanese Patent Application Laid-Open Nos. 2005-108805 and 2006-183977 where the fuel gas is diluted by the catalyst combustion system, there arises such a problem that a temperature locally increases because the blaze is generated in the combustion chamber.

In addition, in order to dilute the fuel gas while maintaining the stable blaze, as is disclosed in Japanese Patent Application Laid-Open No. 2006-183977, it is necessary that the current plate using another part be provided on the upstream side of the combustion portion to supply the pressure loss to the mixture gas, to thereby precisely control the supply quantity of the fuel and the oxidizer.

In particular, in a case of the small-sized combustion chamber, a countermeasure against the quenching phenomenon is required.

DISCLOSURE OF THE INVENTION

The prevent invention is directed to a diluting mechanism for an exhaust fuel which is capable of diluting the exhaust fuel at a low temperature and reducing the sizes with little electric power, and a fuel cell system using the diluting mechanism.

The present invention provides a diluting mechanism for the exhaust fuel which is constituted as follows.

A diluting mechanism for an exhaust fuel according to the present invention, which dilutes the concentration of the exhaust fuel that is exhausted from a device using a fuel in a dilution chamber, includes:

a fuel inlet provided for supplying the exhaust fuel that is exhausted from the device using the fuel to the dilution chamber;

a diluent inlet provided for supplying a diluent to the dilution chamber;

a diffusion flow path provided in the dilution chamber for mixing the exhaust fuel that is supplied from the fuel inlet with the diluent that is supplied from the diluent inlet;

a fuel exhaust port for exhausting the diluted exhaust fuel out of the dilution chamber through the diffusion flow path; and a nozzle that narrows a flow path, provided at the fuel inlet, wherein the nozzle limits a supply quantity of the exhaust fuel to the dilution chamber.

In a diluting mechanism for an exhaust fuel according to the present invention, when a nozzle diameter of the nozzle is d and a purge flow rate of the exhaust fuel that is exhausted from the device using the fuel is Q, a relationship between the purge flow rate Q and the nozzle diameter d is set to meet the following formula:

$$Q=\pi d(2/(\kappa+1))^{1/(\kappa-1)} \times \{2/(\kappa+1)\}^{1/2} \rho v/4$$

where $\kappa$ is a specific heat ratio of the exhausted fuel, $\rho$ is a density, and v is the speed of sound.

In a diluting mechanism for an exhaust fuel according to the present invention, one of a flow path width and a depth of the diffusion flow path is smaller than a quenching distance of the exhaust fuel.

In a diluting mechanism for an exhaust fuel according to the present invention, the diluent inlet is located on an opposite side of the fuel inlet with respect to the diffusion flow path.

In a diluting mechanism for an exhaust fuel according to the present invention, the diluent inlet is constituted as an air supply port that supplies air that is the diluent, and the air supply port can take in the air due to natural diffusion.

In a diluting mechanism for an exhaust fuel according to the present invention, the diluent inlet and the exhaust fuel outlet are made common to each other.

A diluting mechanism for an exhaust fuel according the present invention further includes a fuel catalyst provided in the diffusion flow path for reacting the exhaust fuel with the diluent.

In a diluting mechanism for an exhaust fuel according to the present invention, the fuel catalyst includes any one of platinum, palladium, and a compound containing one of platinum and palladium.

A diluting mechanism for an exhaust fuel according to the present invention further includes a detector for detecting an electric resistance of the fuel catalyst.

The diluting mechanism for an exhaust fuel according to the present invention further includes:

apart from a first fuel flow path that connects the device using the fuel with the fuel inlet, a second fuel flow path for supplying the exhaust fuel to the diffusion flow path from the device using the fuel; and a control valve provided in the second fuel flow path for controlling the supply quantity of the exhaust fuel to the dilution chamber.

A diluting mechanism for an exhaust fuel according to the present invention further includes control valve provided between the device using the fuel and the fuel inlet, for controlling the supply quantity of the exhaust fuel to the dilution chamber.

A diluting mechanism for an exhaust fuel according to the present invention further includes a buffer region provided between the control valve and the fuel inlet, for limiting the supply quantity of the exhaust fuel which is supplied to the dilution chamber to a constant quantity.

The diluting mechanism for an exhaust fuel according to the present invention further includes a control valve provided between the device using the fuel and the fuel inlet that does not completely block a flow in a closed state, instead of the nozzle that narrows the flow path provided at the fuel inlet.

In a diluting mechanism for an exhaust fuel according to the present invention, the control valve is opened when a downstream pressure becomes lower than a first set pressure that is equal to or higher than an outside atmospheric pressure and equal to or lower than a fuel pressure of the device using the fuel, and closed when the downstream pressure exceeds a second set pressure that is higher than the first set pressure.

In a diluting mechanism for an exhaust fuel according to the present invention, the control valve is controlled to be opened when an electric resistance that is detected by the above-mentioned detector becomes lower than a set value, and closed when the electric resistance exceeds the set value.

In a diluting mechanism for an exhaust fuel according to the present invention, the device using the fuel is located within a casing, and an air within the casing is taken into the dilution chamber from the diluent inlet.

In a diluting mechanism for an exhaust fuel according to the present invention, the diluting mechanism is placed at a portion higher than the device using the fuel within the casing in which the device using the fuel is located.

In a diluting mechanism for an exhaust fuel according to the present invention, the fuel exhaust port serves as an air hole for taking in the air to the device using the fuel.

In a diluting mechanism for an exhaust fuel according to the present invention, the device using the fuel has a fuel tank, and the fuel that is emitted from a pressure relief valve of the fuel tank is taken in from one of the fuel inlet and the diluent inlet.

In the diluting mechanism for an exhaust fuel according to the present invention, the device using the fuel includes a fuel cell.

A fuel cell system according to the present invention is equipped with the above-mentioned diluting mechanism for an exhaust fuel.

According to the present invention, it is possible to realize the diluting mechanism for the exhaust fuel which is capable of diluting the exhaust fuel at a low temperature and reducing the sizes with little electric power.

Further features of the present invention will become apparent from the following description of exemplary embodiments with reference to the attached drawings.

BRIEF DESCRIPTION OF THE DRAWINGS

FIGS. 4A and 4B are schematic diagrams for illustrating a second structural example that embodies the second configuration according to the embodiment of the present invention.

FIGS. 5A and 5B are schematic diagrams for illustrating a third structural example that embodies the second configuration according to the embodiment of the present invention.

FIGS. 6A and 6B are schematic diagrams for illustrating a fourth structural example that embodies the second configuration according to the embodiment of the present invention.

FIG. 7 is a schematic diagram for illustrating a third configuration according to the embodiment of the present invention.

BEST MODE FOR CARRYING OUT THE INVENTION

A description will be given of a diluting mechanism for an exhaust fuel according to an embodiment of the present invention.

The diluting mechanism for the exhaust fuel according to this embodiment includes a nozzle that supplies fuel for diluting an exhaust gas from a device that uses a fuel, and a dilution chamber that has an air intake portion with a cross-section that is sufficiently larger than that of the nozzle and burns fuel gas using a catalyst in a space that is narrower than a quenching distance of the fuel.

With the above configuration, a downsized diluting mechanism having a stable performance at a low temperature is realized.

Figure 1:
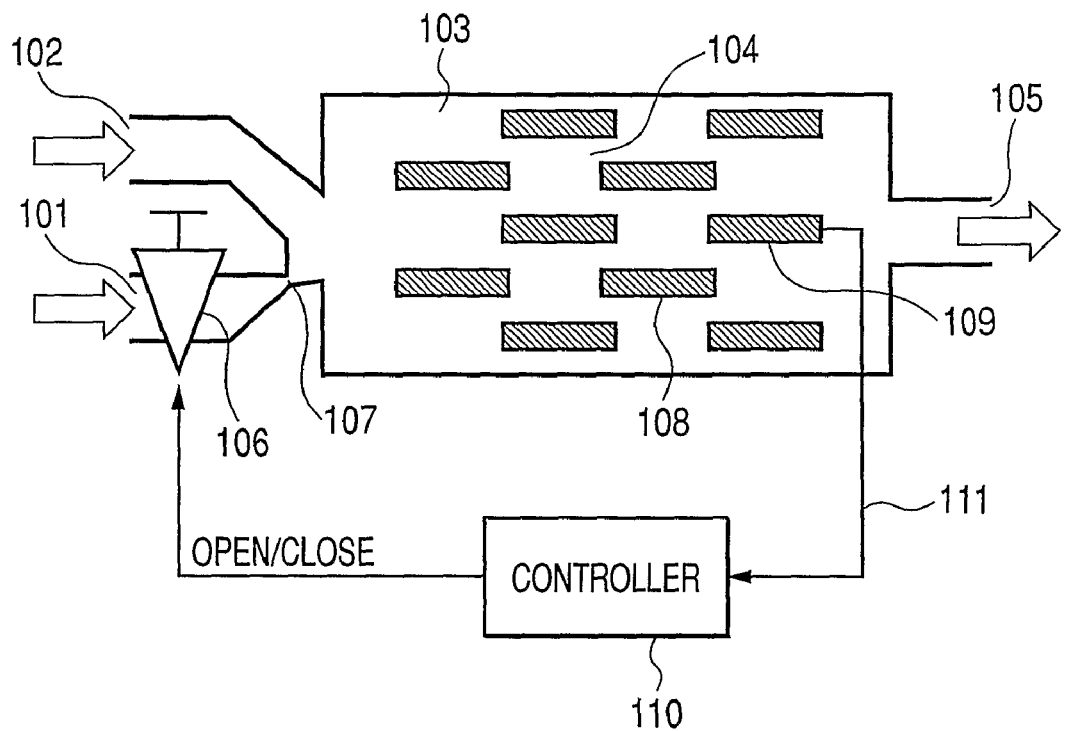
FIG. 1 is a schematic diagram for illustrating a first configuration according to an example of the present invention.

FIG. 1 is a schematic diagram for illustrating a first configuration of a diluting mechanism for an exhaust fuel according to this embodiment.

Referring to FIG. 1, reference numeral 101 denotes a fuel inlet, 102 denotes a diluent inlet, 103 denotes a dilution chamber, 104 denotes a diffusion flow path, 105 denotes an exhaust port, and 106 denotes a control valve (second valve). Also, reference numeral 107 denotes a nozzle, 108 denotes a catalyst, 109 denotes a fuel sensor, 110 denotes a controller, and 111 denotes a wiring. In the following drawings, the same symbols as those in FIG. 1 represent the identical structural elements.

In the diluting mechanism for the exhaust fuel according to this embodiment, an exhaust fuel and a diluent (normally air) are supplied to the dilution chamber 103 from the fuel inlet 101 and the diluent inlet 102, respectively. The supplied exhaust fuel and diluent (normally air) are mixed together and diluted in the dilution chamber 103, and thereafter exhausted from the exhaust port 105.

The supply of the fuel can be controlled by the provision of the control valve 106. In particular, the nozzle 107 is provided between the fuel inlet 101 and the dilution chamber 103. With the configuration, even in a case where a pressure at the fuel inlet is increased, a fuel flow is choked at the nozzle 107 in such a manner that the fuel of a given flow rate or more can be prevented from flowing into the dilution chamber 103.

In the case where the above nozzle is provided, it is unnecessary to precisely control the flow rate by the control valve 106, and the provision of only an on/off function is enough.

Also, the control valve 106 is unnecessary depending on the exhaust system that will be described later.

Now, a description will be given in more detail of a principle of preventing the fuel of a given flow rate or more from flowing into the dilution chamber 103 by provision of the nozzle 107.

Generally, there has been known such a phenomenon that the nozzle is provided in a flow path in which a gas flows, and when a pressure ratio of a pressure upstream of the nozzle to a pressure downstream thereof is equal to or lower than a given value (critical pressure ratio), the flow speed of the gas at the narrowest portion becomes equal to the speed of sound, and the flow speed does not increase higher than the speed of sound (sound speed nozzle).

The critical pressure ratio is represented by the following expression:

$$\gamma_c = \{2/(\kappa+1)\}^{\kappa/\kappa-1}$$

where $\kappa$ is a specific heat ratio, and in the case of hydrogen, $\kappa$ is 1.4 because of a diatomic molecule.

Accordingly, the critical pressure ratio of hydrogen is 0.528. That is, in the case where the downstream pressure is 100 kPa, when the upstream pressure is equal to or higher than 190 kPa, the flow path becomes in a choke state, and the flow speed becomes the speed of sound.

When it is assumed that the flow rate at the nozzle is Qsccm, the following expression is satisfied when the pressure ratio is equal to or lower than the critical pressure ratio.

$$Q = \pi d (2/(\kappa+1))^{1/(\kappa-1)} \times \{2/(\kappa+1)\}^{1/2} \rho v/4$$

In the above expression, $\rho$ is the density of the fluid at the upstream side, and $v$ is the speed of sound. In the case of hydrogen, the density at 1 atm is 0.0899 kg/m³, and the speed of sound at the room temperature is about 1300 m/s.

The above principle is used, for example, when a flow meter is corrected, or the flow rate of a process gas is controlled (refer to Japanese Patent Application Laid-Open No. 2004-360061).

The catalyst 108 is provided in the diffusion flow path 104 of the dilution chamber 103 on a wall surface, and/or an upper surface and a lower surface, thereby enabling decreasing the exhaust fuel concentration with a small amount of diluent (air) by the aid of the catalyst combustion.

The catalyst 108 can be selected from platinum, palladium, or the alloy of those materials.

The catalyst 108 can be formed by forming a film in a solution such as plating or by forming a film in a gas phase such as sputtering.

In particular, in order to more enhance the reactivity, it is preferable that the catalyst layer have a larger surface area.

To achieve this configuration, the flow path is complicatedly formed, and, for example, in the case of using plating, a porous material such as alumina which has been molded can be used.

Also, in the case of sputtering, oxygen is mixed in a chamber atmosphere of the sputter to obtain porous configuration, or platinum fine particles are made slurry and coated.

When the width of the flow path is equal to or shorter than the quenching distance of the fuel, a blaze cannot be generated.

In this case, because the reaction is gently advanced without generating the blaze, the local heat generation is suppressed, and a temperature within the dilution chamber can be substantially made even.

Also, in this embodiment, the electric resistance of the catalyst can be measured. As a result, it is possible to monitor the temperature within the dilution chamber and the fuel concentration.

The catalyst used as the fuel sensor 109 can be made of a dilution catalyst or a catalyst only for monitoring.

In particular, the above porous platinum as well as wired platinum can be used for monitoring.

In particular, in the case of detecting the concentration of the exhaust gas, it is preferable that the fuel sensor 109 be located in the vicinity of the exhaust port 105.

When the temperature within the dilution chamber abnormally increases, or an unprocessed fuel is brought in contact with the catalyst that is the fuel sensor 109 and is burned, the temperature of the fuel sensor 109 increases, and the resistance changes.

In the above manner, the changed resistance is measured by the wiring 111, and in the case where the obtained value exceeds a given value, warning can be given to a user by a warning device (not shown), or the flow rate of the control valve can be reduced by the controller 110.

It is preferable that the flow path within the dilution chamber be narrowed so that the fuel and the diluent are mixed together, and also configured so that the flow is complicatedly repeatedly separated and joins.

Also, in order to prevent the counter flow, it is preferable that the flow path resistance at the exhaust port be lower than the flow path resistance at the fuel inlet and the diluent inlet. Also, it is preferable that the flow be limited to the degree that the mixture and dilution are sufficiently conducted.

In particular, in the case where it is difficult to positively increase the dilution gas quantity with respect to the fuel gas as in a case where the dilution gas is taken in only by natural diffusion, the diluent inlet and the exhaust port can be made common to each other.

Figure 2:
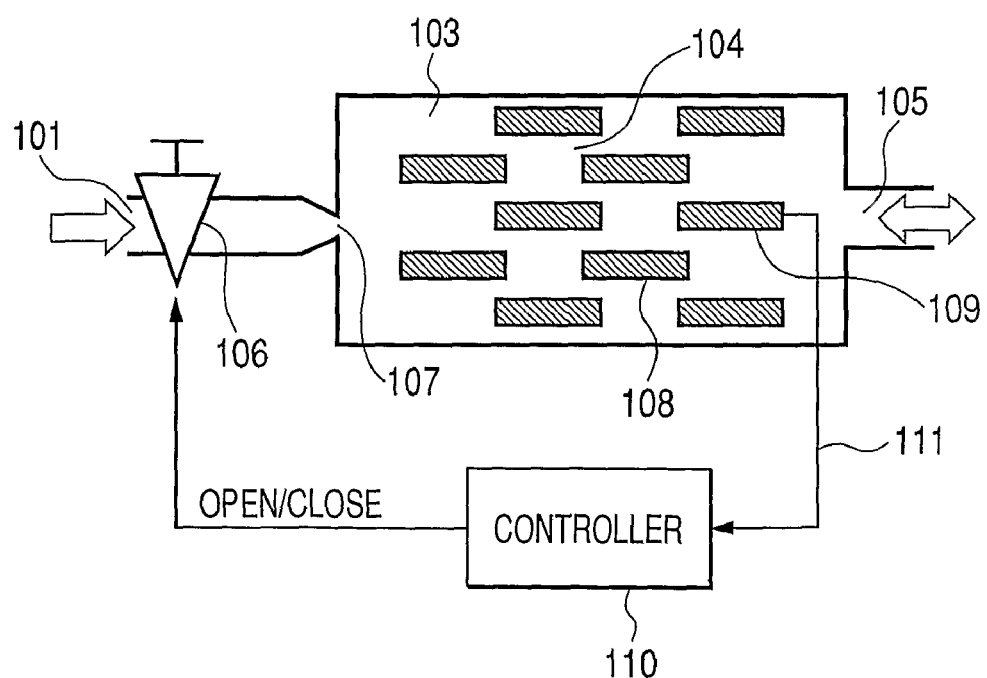
FIG. 2 is a schematic diagram for illustrating a second configuration according to the embodiment of the present invention.

FIG. 2 illustrates a second configuration of the dilute mechanism of the exhaust fuel in this embodiment, in which the diluent inlet 101 and the exhaust port 105 are made common to each other.

In this case, the diluent is supplied to the dilution chamber 103 from an opposite side of the fuel. The exhaust port (also serves as the diluent intake port) is sufficiently larger than that fuel inlet, thereby enabling taking in the diluent sufficient for dilution only by the natural diffusion.

As a configuration in which the diameter of the exhaust port is made larger than the fuel inlet, for example, there can be applied configurations illustrated in FIGS. 3A to 3C, 4A, 4B, 5A, 5B, 6A, and 6B.

Figure 3A:
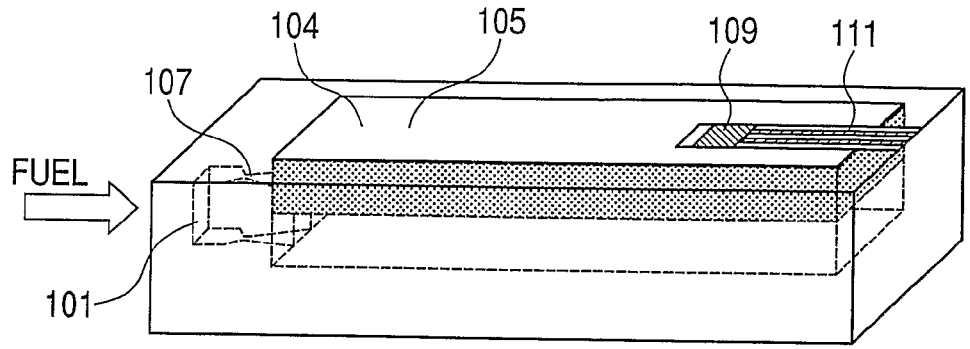
FIGS. 3A, 3B and 3C are schematic diagrams for illustrating a first structural example that embodies the second configuration according to the embodiment of the present invention.
Figure 3B:
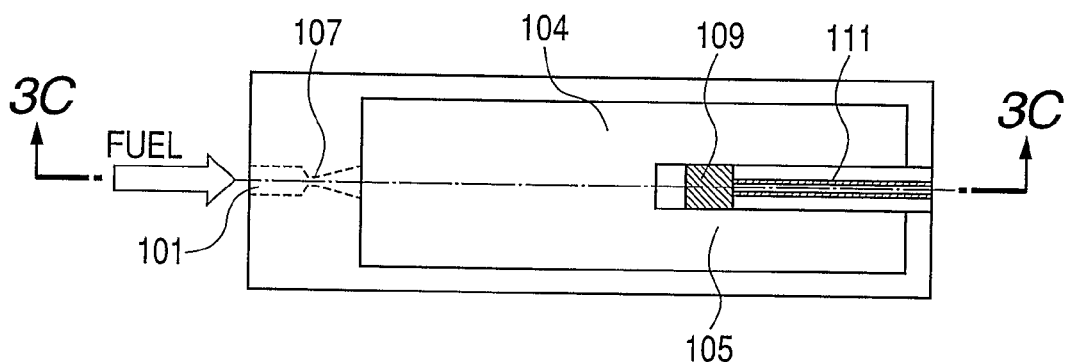
Figure 3C:
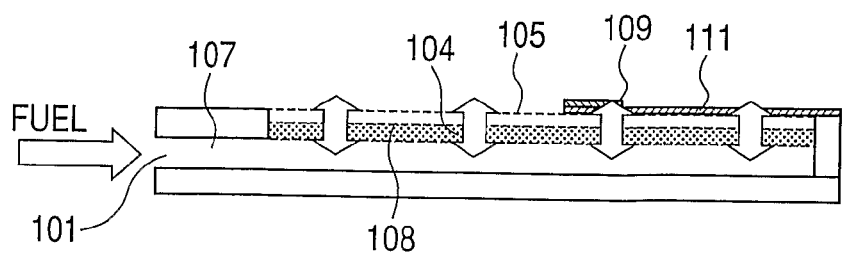

FIGS. 3A, 3B and 3C illustrate schematic diagrams of a first structural example that embodies a second configuration according to the embodiment of the present invention. FIG. 3A is a schematic perspective view, FIG. 3B is a schematic top view, and FIG. 3C is a schematic cross-sectional view taken along a line 3C-3C of FIG. 3B.

The details of the structure and the manufacturing method will be described later. The catalyst 108 is provided on the porous wall surface of the diffusion flow path 104 having a porous or lattice configuration. In this example, the opening diameter of the lattice or the aperture diameter of the porous member is set to be equal to or shorter than the quenching distance of the fuel.

That is, in the case where the fuel gas is hydrogen, the opening diameter or the aperture diameter is set to be equal to or shorter than 500 µm that is the quenching distance of hydrogen, for example, set to 300 µm. In addition, in order to retain the structure and increase the surface area, it is possible that the lattice flow path is fabricated and used as a beam, and the opening portion is made porous.

The fuel inlet 101 for supplying the fuel is provided on the lower surface side of the diffusion flow path 104.

Then, the exhaust port 105 that serves as the diluent inlet is provided on the upper surface side of the diffusion flow path 104.

In this case, the nozzle is of the slit configuration having a uniform gap in the vertical direction. The nozzle sizes depend on the kind of gas, the pressure, and the flow rate. For example, in the case where the fuel is hydrogen, the pressure at the fuel inlet is 200 kPa, when the height of the slit is 300 µm and the width is 40 µm, the flow rate can be limited to about 100 cc/min.

The sizes of a space between the nozzle and the diffusion flow path are designed so as to be equal to or lower than the quenching distance for the fuel to be diluted in at least one direction. In the case of FIG. 3C, the height direction is set to be equal to or lower than the quenching distance.

The parts that are used in the description of FIG. 2 can be used as the fuel sensor 109.

FIGS. 4A and 4B illustrate a second structural example that embodies the second configuration according to the embodiment of the present invention. FIG. 4B is a cross-sectional view taken along the line 4B-4B in FIG. 4A. In this example, the diffusion flow path 104 that is made of porous material on the surface of which the catalyst is formed is provided so as to cover the upper surface of a cylindrical portion. The exhaust port 105 that also serves the diluent inlet is provided on the upper surface of the diffusion flow path 104.

The fuel inlet 101 for taking in the fuel from the rear surface side of the diffusion flow path 104 is provided. In the case where the nozzle is circular in the cross section of the flow path, and the pressure at the fuel inlet is 200 kPa, the diameter of the thinnest portion of the nozzle is properly about 125 µm.

Also, FIGS. 5A and 5B are a third structural example that embodies the second configuration according to the embodiment of the present invention. FIG. 5B is a cross-sectional view taken along the line 5B-5B in FIG. 5A. In this example, a cylindrical portion of a hollow cylindrical portion is formed of the diffusion flow path 104 which is made of the porous material on which the catalyst is formed. The exhaust port 105 that also serves as the diluent inlet is formed on the outer cylindrical surface of the diffusion flow path 104.

The fuel is supplied to the hollow portion of the hollow cylindrical portion from the lower side through the fuel inlet 101.

Also, FIGS. 6A and 6B are a fourth structural example that embodies the second configuration according to the embodiment of the present invention. FIG. 6B is a cross-sectional view taken along the line 6B-6B in FIG. 6A. In this example, a spherical portion of a hollow spherical portion is formed of the diffusion flow path 104 that is made of a porous member having the catalyst. The exhaust port 105 that also serves as the diluent inlet is formed on the outer spherical surface of the diffusion flow path 104.

The fuel is supplied to the hollow portion of the hollow spherical portion from the lower side through the fuel inlet 101.

In the case where the fuel is intermittently supplied to the fuel inlet, there can be applied a third configuration in this embodiment illustrated in FIG. 7.

In this configuration, a buffer region 112 is provided between the control valve (second valve) 106 and the nozzle 107, to thereby enable a constant quantity of fuel to continuously flow into the dilution chamber 103. Note that the exhaust port also serves as the diluent inlet.

When the fuel that is intermittently supplied is diluted at once, the dilution chamber having a large volume is required. On the other hand, the provision of the buffer region 112 limits the supply quantity of the fuel that is supplied to the dilution chamber to a constant quantity, enabling reducing the volume of the dilution chamber.

According to the above configuration of the diluting mechanism, the exhaust gas of a device using the fuel, such as a fuel cell or a combustion device can be reduced in the concentration at a low temperature. Also, it is possible to downsize the system, and more particularly, this diluting mechanism is useful in downsizing the fuel cell using a polymer electrolyte membrane.

Hereinafter, examples of the present invention will be described.

EXAMPLE 1

In Example 1, a description will be given of a method of manufacturing the diluting mechanism illustrated in FIG. 2 (apart from the control valve 106) using a semiconductor processing technique.

FIGS. 8A to 8F are process charts for illustrating a process of fabricating the diluting mechanism according to this example.

Referring to FIGS. 8A to 8F, reference numeral 101 denotes a fuel inlet, 104 denotes a diffusion flow path, 105 denotes an exhaust port (dilution inlet), 107 denotes a nozzle, 108 denotes a catalyst, 109 denotes a fuel sensor, 111 denotes a wiring, 201 denotes a substrate 1, 202 denotes a substrate 2, and 203 denotes a mask.

Figure 8A:
FIGS. 8A, 8B, 8C, 8D, 8E, and 8F are process charts for illustrating a process of fabricating a diluting mechanism according to Example 1 of the present invention.

In a step illustrated in FIG. 8A, the substrate 1 (201) made of silicon wafer which is used in this manufacturing process is prepared.

The wafer is, for example, 525 µm in thickness.

In a case where ICP-RIE is used in an etching step that will be described later, it is preferable that, though the plane orientation of the substrate is not particularly limited, (100) plane be directed upward in a case of using an anisotropic wet etching.

Figure 8B:
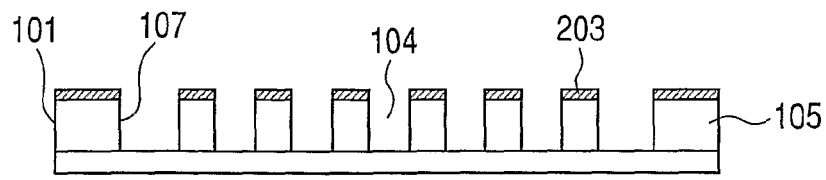

In a step illustrated in FIG. 8B, the dilution chamber, the fuel inlet, the dilution inlet (exhaust port), and the diffusion flow path are formed.

A flow path pattern is patterned through photolithography, and a wafer is etched. The anisotropic wet etching using ICP-RIE or KOH can be used in the etching. The etching depth is about 300 µm.

Also, in the case where the fuel gas is hydrogen, an interval of the diffusion flow path 104 is equal to or shorter than 500 µm, that is, the quenching distance of hydrogen, for example, set to 300 µm.

In this example, the nozzle is applied with the slit configuration having a uniform gap in the vertical direction. In this example, because the fuel is hydrogen, the pressure at the fuel inlet is 200 kPa, the height of the slit is 300 μm, and the width of the slit is 40 μm, the flow rate can be controlled to 100 cc/min.

A photoresist of a thick film can be used or aluminum or silicon oxide can be used as a mask for etching. After etching, the mask and the photoresist are removed.

Figure 8C:
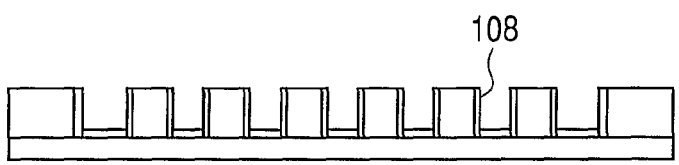

In a step illustrated in FIG. 8C, a catalyst layer is formed in the diffusion flow path.

Pt can be used as the catalyst.

The catalyst can be formed by sputtering or plating as well as coating slurry made of fine particles. The sputtering can be conducted under an inert gas such as normal argon or nitrogen. Alternatively, oxygen can be mixed during sputtering, thereby enabling forming a catalyst layer that is large in the surface area.

Figure 8D:

In a step illustrated in FIG. 8D, the substrate 2 (202) that is a wafer used as an upper plate is prepared. The wafer can be made of silicon or Pyrex (registered trademark) glass. The thickness of the wafer is, for example, 525 μm.

Figure 8E:

FIG. 8E is a step of forming the wiring 111 as well as the fuel sensor 109.

The electrode and the wiring 111 can be made of Au, and it is formed on a thin Cr layer through the sputtering or EB vapor deposition to obtain a good quality of film.

In addition, the fuel sensor 109 is formed by forming a film made of Pt or Pd through the sputtering.

It is preferable that the wiring 111 and the fuel sensor 109 be patterned by the lift off or the shadow mask using the photoresist.

Also, the electrode and the wiring 111 can be made of Pt, and in this case, the wiring layer and the sensor layer can be made common to each other.

Figure 8F:
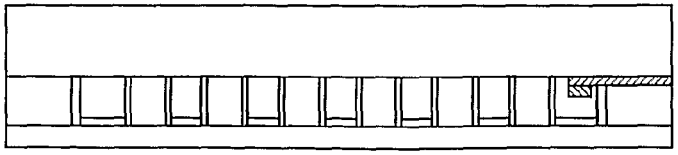

In a step illustrated in FIG. 8F, two substrates are adhered to each other.

An adhesive can be used for bonding. In the case where the substrate 2 (202) is made of silicon wafer, the diffusion bonding can be used. In the case where the substrate 2 (202) is made of the Pyrex (registered trademark) glass, anodic bonding can be used.

The diluting mechanism illustrated in FIG. 2 is manufactured through the above respective steps.

EXAMPLE 2

In Example 2, a description will be given of a method of manufacturing the diluting mechanism illustrated in FIG. 3 (apart from the control valve 106) using the semiconductor processing technique.

FIGS. 9A to 9G are process charts for illustrating a process of fabricating the diluting mechanism according to this example.

Referring to FIGS. 9A to 9G, reference numeral 101 denotes a fuel inlet, 104 denotes a diffusion flow path, 105 denotes an exhaust port (dilution inlet), 107 denotes a nozzle, 108 denotes a catalyst, 109 denotes a fuel sensor, 111 denotes a wiring, 201 denotes a substrate 1, and 202 denotes a substrate 2.

Figure 9A:
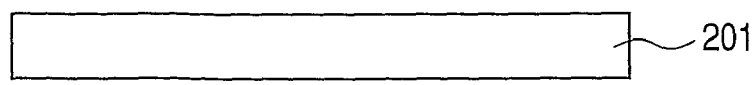
FIGS. 9A, 9B, 9C, 9D, 9E, 9F, and 9G are process charts for illustrating a process of fabricating a diluting mechanism according to Example 2 of the present invention.

In a step illustrated in FIG. 9A, first, the substrate 1 (201) made of a wafer which is used in this manufacturing process is prepared.

In this case, a wafer having a thickness of 525 μm is used. The wafer can be made of a silicon wafer, and in a case where ICP-RIE is used in an etching step that will be described later, the plane orientation of the substrate is not particularly limited.

However, in a case of using the anisotropic wet etching, the plane orientation of the substrate is selected in correspondence with the configuration of the nozzle 107. Also, the wafer can be made of a glass wafer.

Figure 9B:

In a step illustrated in FIG. 9B, the fuel inlet 101 and the nozzle 107 are formed.

In this step, a flow path pattern is patterned through photolithography, and a wafer is etched.

The anisotropic wet etching using ICP-RIE or KOH can be used in the etching.

The etching depth is about 300 μm. Also, in a case where the fuel gas is hydrogen, the etching depth is equal to or less than 500 μm that is the quenching distance of hydrogen, for example, is set to 300 μm.

In this case, the nozzle is applied with the slit configuration having a uniform gap in the vertical direction. In this example, because the fuel is hydrogen, the pressure at the fuel inlet is 200 kPa, the height of the slit is 300 μm, and the width of the slit is 40 μm, the flow rate can be controlled to 100 cc/min.

A photoresist of a thick film can be used or aluminum or silicon oxide can be used for a mask for etching.

After etching, the mask and the photoresist are removed. In a case of using the glass wafer, the flow path can be processed by using sandblasting or etching with concentrated hydrofluoric acid.

Figure 9C:

In a step illustrated in FIG. 9C, the substrate 2 (202) that is a wafer used in this process is prepared. A silicon wafer is used for the wafer.

Figure 9D:
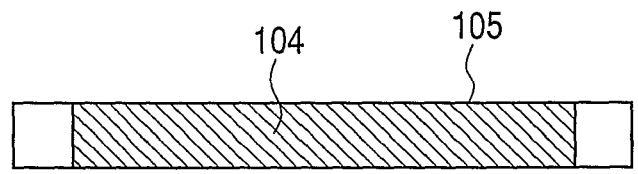

In a step illustrated in FIG. 9D, the diffusion flow path 104 and the exhaust port 105 (dilution inlet) are formed.

The diffusion flow path 104 is formed by a porous member or a lattice flow path. The porous flow path can be manufactured by anodizing a p-doped silicon wafer in the concentrated hydrofluoric acid.

Also, the lattice flow path can be manufactured by the anisotropic etching using ICP-RIE or KOH.

In this case, the opening diameter of the lattice or the pore diameter of the porous member is set to be equal to or less than the quenching diameter of the fuel.

That is, in a case where the fuel gas is hydrogen, the opening diameter or the bore diameter is set to be equal to or less than 500 μm which is the quenching distance of hydrogen, for example, is set to 300 μm. In addition, in order to retain the structure and increase the surface area, it is possible that the lattice flow path is fabricated and used as a beam, and the opening portion is made porous.

Figure 9E:
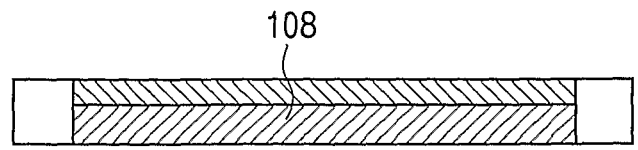

In a step illustrated in FIG. 9E, a catalyst layer is formed in the diffusion flow path.

Pt can be used as the catalyst. The catalyst can be formed by sputtering or plating as well as coating slurry made of fine particles.

The sputtering can be conducted under an inert gas such as normal argon or nitrogen. Alternatively, oxygen can be mixed during sputtering, thereby enabling to form a catalyst layer that is large in the surface area. It is preferable to form a film from a side (lower surface of the figure) close to the fuel flow path.

Figure 9F:
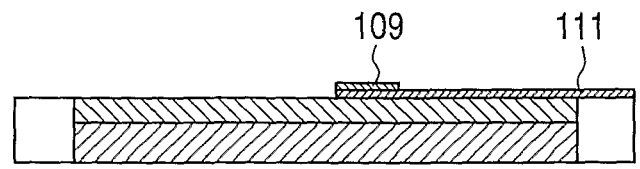

In a step illustrated in FIG. 9F, the wiring 111 and the fuel sensor 109 are formed.

The electrode and the wiring 111 can be made of Au, and it is formed on a thin Cr layer through the sputtering or EB vapor deposition to obtain a good quality of film.

In addition, the fuel sensor 109 is formed by forming a film made of Pt or Pd through the sputtering.

It is preferable that the wiring 111 and the fuel sensor 109 are patterned by the lift off or the shadow mask using the photoresist. Also, the electrode and the wiring 111 can be made of Pt, and in this case, the wiring layer and the sensor layer can be made common to each other.

Figure 9G:
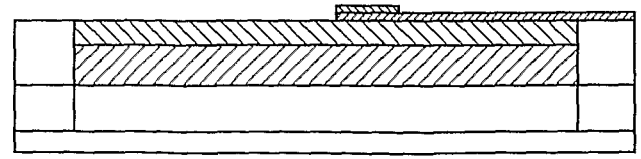

In a step illustrated in FIG. 9G, two substrates are adhered to each other.

An adhesive can be used for bonding. In a case where the substrate 1 (201) is made of silicon wafer, the diffusion bonding can be used. In a case where the substrate 1 (201) is made of the Pyrex (registered trademark) glass, anodic bonding can be used.

The diluting mechanism illustrated in FIG. 3 is manufactured through the above respective steps.

EXAMPLE 3

In Example 3, a description will be given of a fuel cell system in which the diluting mechanism of the present invention is mounted as the purge gas processing device of the fuel cell.

Figure 10:
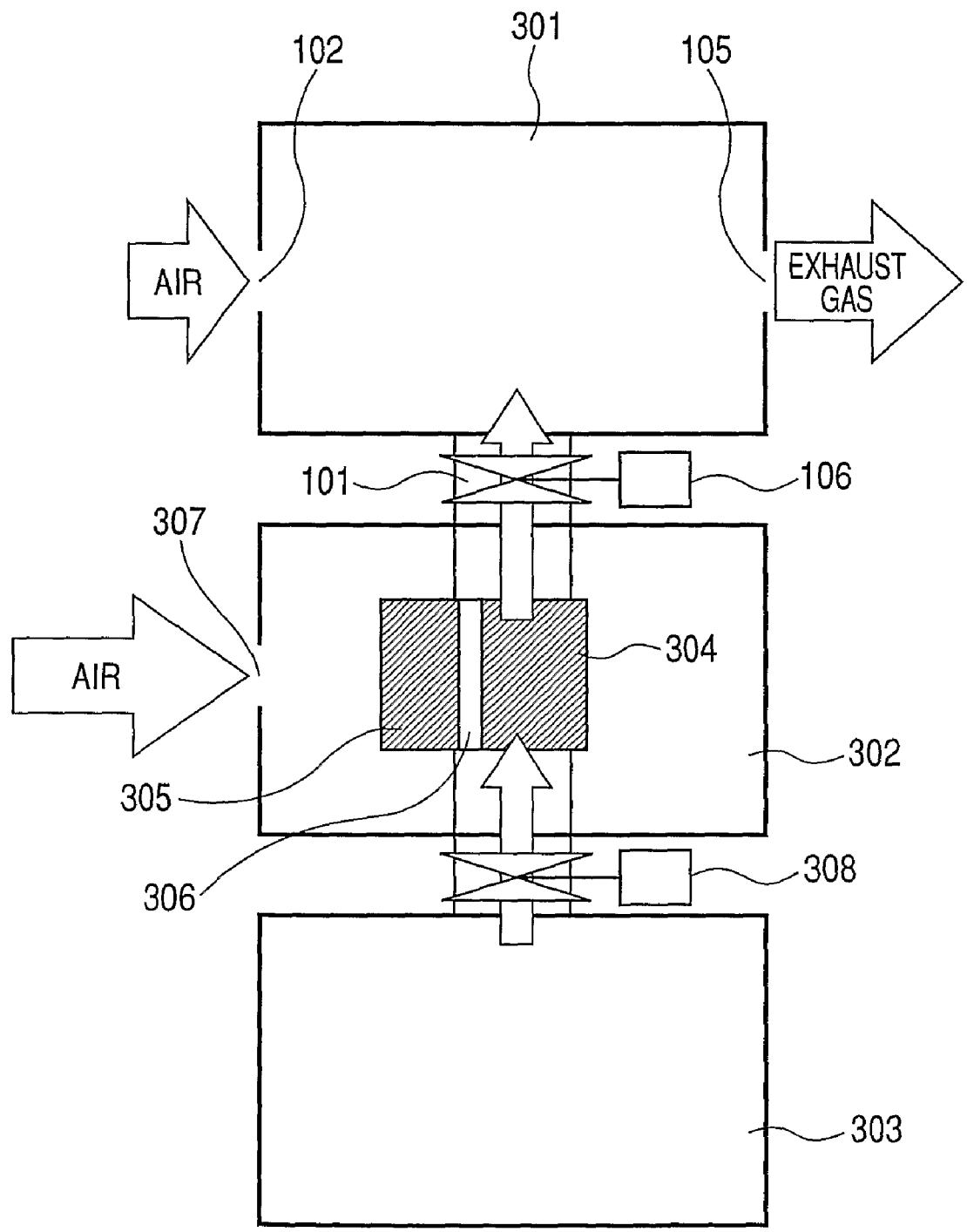
FIG. 10 is a schematic diagram for illustrating the configuration of a fuel cell system that mounts the diluting mechanism of Example 3 of the present invention as a purge gas processing device for a fuel cell.

FIG. 10 is a schematic diagram for illustrating the configuration of a fuel cell system according to this example. Referring to FIG. 10, reference numeral 101 denotes a fuel inlet, 102 denotes a diluent inlet, 105 denotes an exhaust port, 301 denotes a diluting mechanism, 302 denotes a fuel cell, 303 denotes a fuel tank, 304 denotes an anode, 305 denotes a cathode, 306 denotes an electrolyte membrane, and 307 denotes an air hole.

In this example, a fuel is stored in the fuel tank 303, and supplied to the anode 304 of the fuel cell 302 through a fuel flow path.

When the fuel can be made of, for example, hydrogen, and the fuel tank 303 is filled with a hydrogen storing alloy, hydrogen can be stored at a lower pressure and with high efficiency.

Also, a first valve 308 and a control valve (second valve) 106 are provided within the fuel flow path. The first valve 308 controls the supply of the fuel to the fuel cell 302 from the fuel tank 303, and the control valve 106 exhausts the fuel out of the fuel flow path.

The fuel flow path of the second valve is connected to the diluting mechanism 301.

The exhaust fuel that has been supplied to the diluting mechanism is exhausted from the exhaust port 105 after the exhaust fuel has been diluted by the air.

On the other hand, the air can be taken in from the air hole due to the natural diffusion as the oxidizer. The generated electric power is supplied to an external device through an output terminal.

Now, a description will be given of the operation of the diluting mechanism which is attributable to the purge operation of the fuel cell.

A slight amount of air enters an anode chamber of the fuel cell through the electrolyte membrane or another member.

The oxygen in the air reacts with the fuel by the catalyst into water. Also, water that has been generated at the cathode, which is attributable to the power generation, also diffuses in the electrolyte membrane and reaches the anode.

That is, impurities such as nitrogen or water (moisture), in addition to the fuel, accumulate in the anode. Accordingly, in order to prevent the power generation performance from being deteriorated which is attributable to a reduction in the fuel concentration within the anode, there is required the purge operation of exhausting the impurities within the anode.

A purge command can be issued to the fuel cell when a given time elapses after the power generation or when the monitored voltage of the fuel cell becomes lower than a given value.

Also, the purge command can be issued when the impurity concentration exceeds a given value or when the measured gas concentration within the fuel flow path becomes lower than a given value.

In this case, as an example, the diluting mechanism that has been manufactured through the manufacturing method described in Example 1 is used as the diluting mechanism.

In a case where the purge is conducted according to the purge command, the purge is conducted at the flow rate of about 100 sccm for several seconds in the small-sized fuel cell that is about 1 cc in the anode volume, depending on the anode volume, the pressure loss of the anode, or the flow path pattern.

In this case, the diameter of the nozzle 107 of the diluting mechanism is set to 125 μm, and the flow rate of 100 sccm is exhausted.

The fuel that has been supplied to the diluting mechanism is diluted within the dilution flow path, and exhausted.

In a case where the purge flow rate is too high, and the fuel cannot be sufficiently diluted, a detected value of the fuel sensor 109 is increased to close the second valve 106.

The purging operation can be terminated after a given time has elapsed, or when the voltage of the fuel cell exceeds the given value.

Also, the purging operation can be terminated when the value of the fuel sensor 109 exceeds a given value.

Alternatively, a buffer region can be provided as illustrated in FIG. 7.

For example, it is assumed that one purging operation is conducted for two seconds at 100 sccm, and the purging operation is conducted once every 30 minutes. When it is assumed that the buffer region is set to about 3 cc, and the diameter of the nozzle 107 is set to 3 μm, the flow rate of the exhaust fuel is about 0.1 sccm.

Accordingly, the purged gas accumulates in the buffer region once, and is then slowly supplied to the diluting mechanism over 30 minutes.

With the above operation, the volume of the diluting mechanism can be reduced, and the quantity of exhaust fuel that is processed at once is small. As a result, it is possible to prevent the heat generation or the exhaust gas quantity from increasing instantaneously.

The control valve 106 can be formed of an active valve that is controlled by electromagnetic force. Alternatively, as disclosed in Japanese Patent Application Laid-Open No. 2004-031199, the control valve 106 can be formed of a small-sized pressure reducing valve having such a hysteresis that a pressure under which the valve is opened and a pressure under which the valve is closed are different from each other.

Also, the small-sized pressure reducing valve holds the downstream pressure to a given value without requiring electric power, and the set pressure thereof can be designed to various values.

Accordingly, the above valve is used, and the valve is so set as to be opened when the downstream pressure of the pressure reducing valve does not exceed a first given value, and closed when the downstream pressure exceeds a second given value. The first given value is equal to or higher than the outside atmospheric pressure and equal to or lower than the fuel pressure of the anode flow path of the fuel cell. The second given value is higher than the first given pressure.

With the above arrangement, the exhaust gas can be held to be equal to or lower than an appropriate concentration without allowing the fuel of a constant quantity or more to flow into the diluting mechanism at once.

In addition, according to the above pressure reducing valve, because the structure is simple and no power source for driving is required, the pressure reducing valve is proper for reducing the sizes of the system and reducing the power consumption.

EXAMPLE 4

In Example 4, a description will be given of the configuration of a fuel cell system on which the diluting mechanism of the present invention is mounted as the purge gas processing device of the fuel cell, which is different from Example 3.

The relationship between the fuel cell and the diluting mechanism is not basically different from that of Example 3 illustrated in FIG. 10. However, the purging operation according to this example is not intermittently conducted, but is so configured as to continuously exhaust a constant quantity of gas which is larger than the entrance rate of the impurities.

Figure 11:
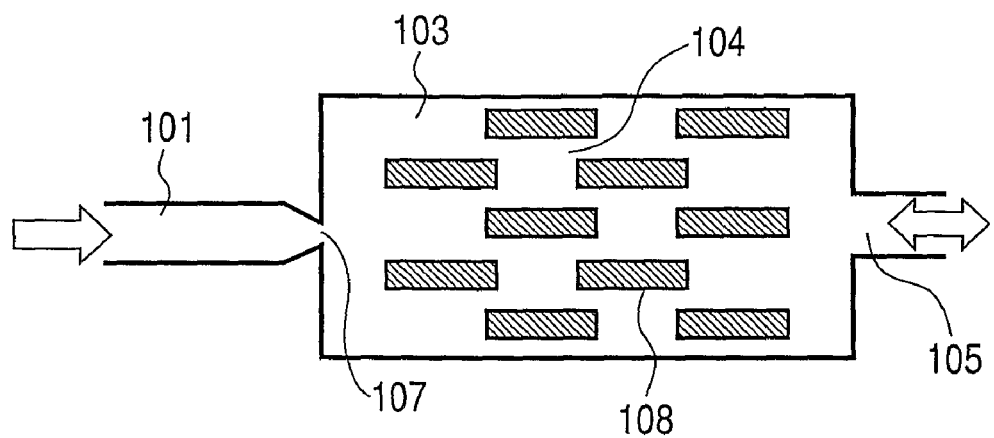
FIG. 11 is a schematic diagram for illustrating a configuration of a first diluting mechanism according to Example 4 of the present invention.

FIG. 11 illustrates a schematic diagram for illustrating the configuration of a first diluting mechanism according to this example. As illustrated in FIG. 11, the diluting mechanism according to this example is so designed as to always exhaust the gas of a limited flow rate by a nozzle 107 at the entrance of the dilution chamber 103 without using the second valve 106. Note that reference numeral 105 denotes an exhaust port (diluent inlet).

In a case where the fuel is made of hydrogen, the diameter of the nozzle is 3 μm, and the pressure within the fuel cell anode is 200 kPa, the gas flow rate is about 0.1 sccm.

On the other hand, in a case where the interior of the fuel cell anode is replaced with the air because the fuel cell is prevented from being deteriorated at the time of stoppage of the fuel cell, or the fuel cell has not been used for a long period of time, it is necessary that the air within the anode is replaced with the fuel at the time of start-up.

In the case, because the flow rate is low in the above diluting mechanism, it may take a time to start up the fuel cell.

Figure 12:
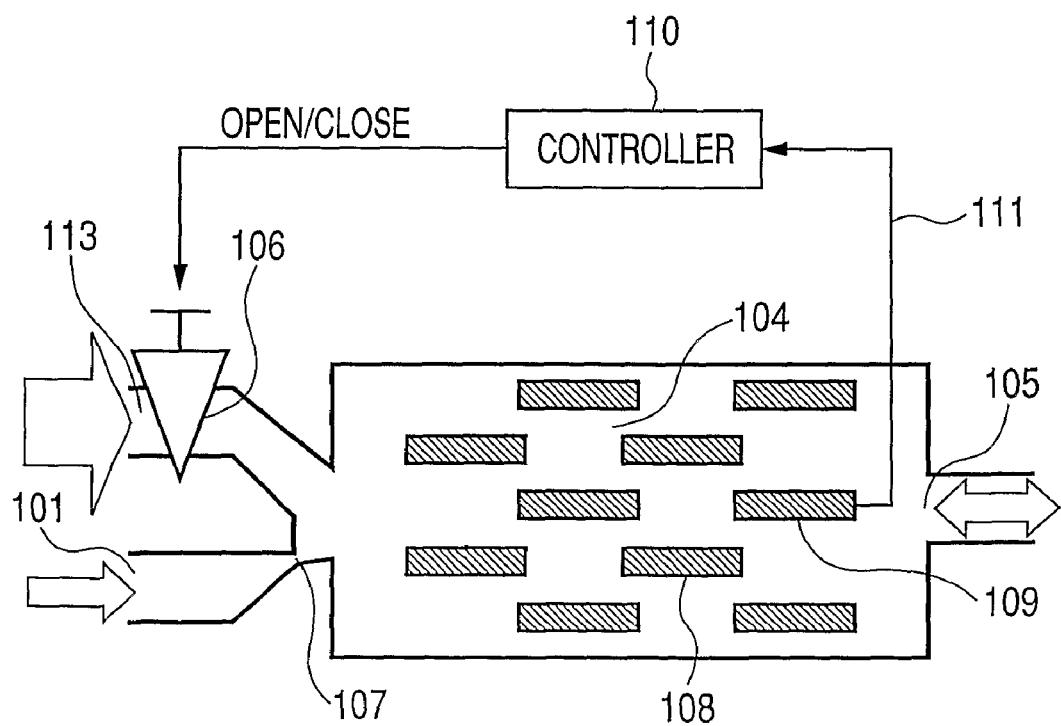
FIG. 12 is a schematic diagram for illustrating a configuration of a second diluting mechanism according to Example 4 of the present invention.

In the above situation, the following second diluting mechanism can be applied. FIG. 12 illustrates a schematic diagram for illustrating the configuration example of the second diluting mechanism.

As illustrated in FIG. 12, a second flow path that is another flow path different from the flow path having the nozzle 107 is provided as a flow path that extends from the fuel cell 302 to the diluting mechanism. The replacement of the air with the fuel can be conducted quickly by opening the control valve (second valve) 106 within the flow path at the time of start-up.

The second valve can be closed when the impurity gas at the time of start-up is purged if the second valve is configured so as to be closed when the fuel concentration that is detected by the fuel sensor 109 exceeds a given value. Further, with the above configuration, the second valve 106 is also opened when the power generation is terminated and the first valve 308 is closed. As a result, the interior of the anode can be easily replaced with the air, thereby preventing the fuel cell from being deteriorated. Note that reference numeral 113 denotes a second fuel inlet.

Further, when a pressure loss of a part of the fuel flow path of the fuel cell 302 is large, the following configuration is effective. The flow path is branched downstream of the first valve 308 and upstream of a high pressure loss portion. One branched is connected to the fuel cell 302 and the other is connected to the second fuel inlet 113. In addition, an exhaust flow path from the fuel cell 302 is connected to the fuel inlet 101. In this configuration, at start-up, an impure gas upstream from the branched point is immediately exhausted from the second flow path inlet 113 to the diluting mechanism 301. An impure gas downstream from the high pressure loss portion is slowly exhausted from the fuel inlet 101. Such a start-up method provides a rapid purge operation at the start-up even when there is a high pressure loss portion.

Also, even when, instead of the provision of the second flow path, a control valve that is not perfectly closed (a valve having a small flow rate even when closed) is arranged as the second valve 106 instead of the nozzle 107 as illustrated in FIG. 2, the start-up characteristic can be improved.

Figure 13:
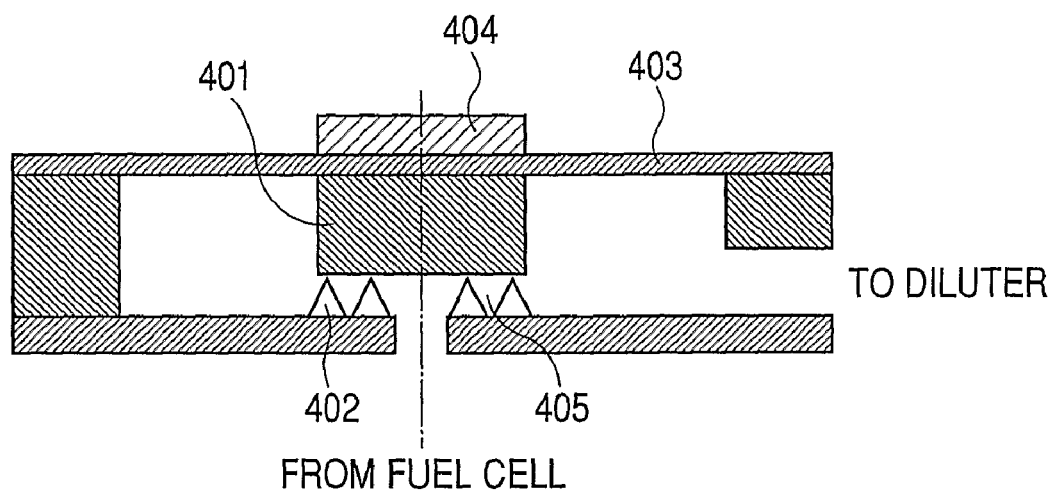
FIG. 13 is a cross-sectional view illustrating the outline for describing a configuration of a control valve according to Example 4 of the present invention.

FIG. 13 illustrates the structural example of the control valve that is not perfectly closed instead of the nozzle 107.

Referring to FIG. 13, reference numeral 401 denotes a valve disc, 402 denotes a valve seat, 403 denotes a diaphragm, 404 denotes an actuator, and 405 denotes a gap.

As illustrated in FIG. 13, the control valve is constituted so as to allow a slight amount of flow to occur from the gap 405 even in the closed state.

EXAMPLE 5

In Example 5, a description will be given of a structural example of a fuel cell system in which the diluting mechanism according to the present invention is provided within a casing of the fuel cell.

Figure 14:
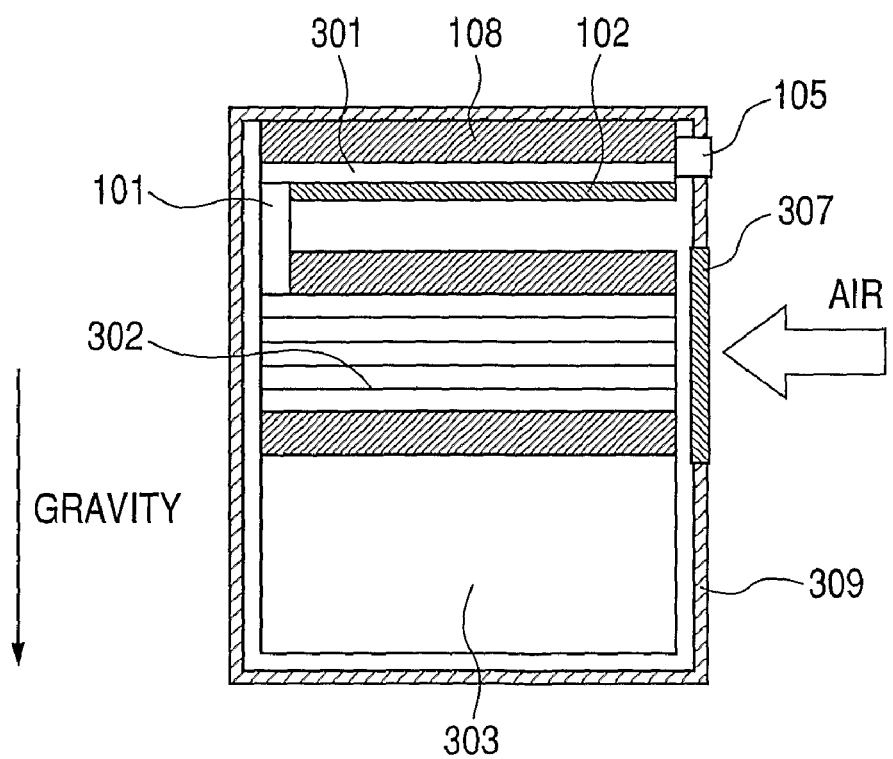
FIG. 14 is a schematic diagram for illustrating a configuration of a first fuel cell system that mounts a diluting mechanism according to Example 5 of the present invention.

FIG. 14 is a schematic diagram for illustrating the configuration of a first fuel cell system that is equipped with a diluting mechanism according to this example.

Referring to FIG. 14, reference numeral 101 denotes a fuel inlet, 102 denotes a diluent inlet, 105 denotes an exhaust port, 108 denotes a catalyst, 301 denotes a diluting mechanism, 302 denotes a fuel cell, 303 denotes a fuel tank, 307 denotes an air hole, and 309 denotes a casing of the fuel cell.

In this example, the diluent inlet 102 is provided in the interior of the casing 309 of the fuel cell. With the above arrangement, even when a leakage occurs within the system due to the damaged fuel cell, and the fuel is leaked into the casing, the leaked fuel is taken into the diluting mechanism 301 from the diluent inlet 102 to be diluted and exhausted.

In particular, in a case where the fuel is lighter than the air as with hydrogen, the leaked fuel diffuses upward. Therefore, it is preferable that the diluting mechanism 301 be provided on an upper portion of the interior of the fuel cell system.

Figure 15:
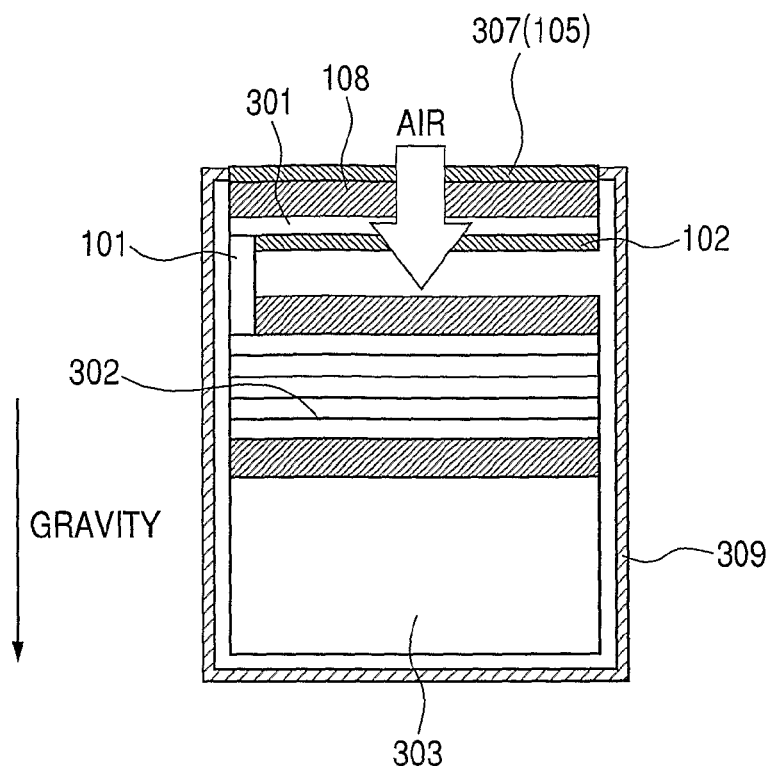
FIG. 15 is a schematic diagram for illustrating a configuration of a second fuel cell system that mounts the diluting mechanism according to Example 5 of the present invention.
Figure 16:
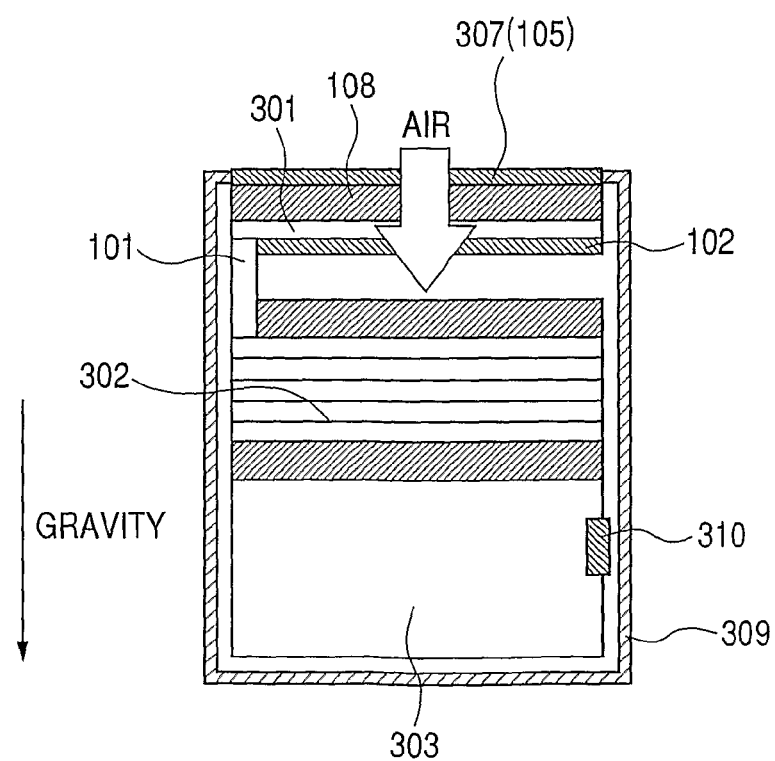
FIG. 16 is a schematic diagram for illustrating a configuration of a third fuel cell system that mounts the diluting mechanism according to Example 5 of the present invention.

Also, it is possible that the exhaust port 105 is made large in the area, and also serves as the fuel cell air hole 307 as in the structural example of a second fuel cell system illustrated in FIG. 15. Also, in a case where a pressure relief valve 310 that opens when the tank pressure exceeds a given value is provided in the fuel tank 303 as in the structural example of a third fuel cell system illustrated in FIG. 16, the fuel that is released by the pressure relief valve 310 can be guided to the diluting mechanism 301. In FIGS. 15 and 16, the same symbols as those in FIG. 14 represent the identical configurations with those in FIG. 14.

EXAMPLE 6

In Example 6, a description will be given of a manufacturing method of the diluting mechanism illustrated in FIG. 4 (apart from the control valve 106) using the semiconductor processing technique.

FIGS. 17A to 17D are process charts for illustrating a process of fabricating a diluting mechanism according to this example.

Referring to FIGS. 17A to 17D, reference numeral 104 denotes a diffusion flow path, 107 denotes a nozzle, 108 denotes a catalyst, 111 denotes a wiring, and 203 denotes a substrate.

Figure 17A:
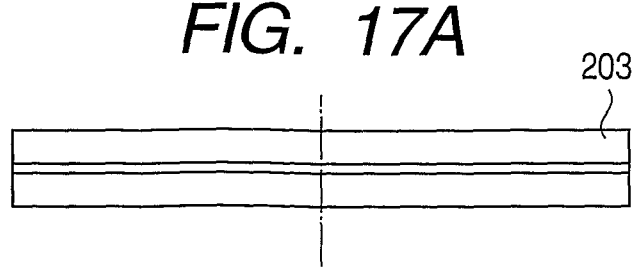
FIGS. 17A, 17B, 17C and 17D are process charts for illustrating a process of fabricating a diluting mechanism according to Example 6 of the present invention.

In a step illustrated in FIG. 17A, the substrate 203 that is a silicon wafer used in this process is prepared.

As a wafer, a silicon on insulator (SOI) wafer whose both surfaces are polished in order to etch both surfaces between which an oxide film layer that can be used as a stop layer of the etching is interposed is preferable. The thickness of the respective layers is 300 µm in the handle layer, 1 µm in the BOX layer, and 1 µm in the device layer. In a case where ICP-RIE is used in the etching process used later, the plane orientation of the substrate is not particularly limited. However, in the case where anisotropic wet etching is used, it is preferable that (100) plane be directed upward.

Figure 17B:
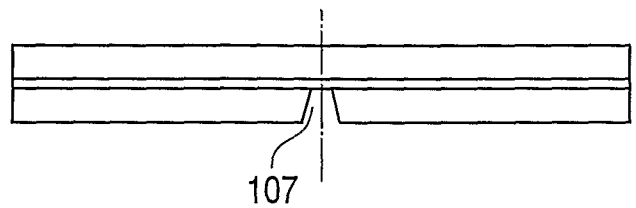

Subsequently, in a step illustrated in FIG. 17B, the fuel inlet and the nozzle are formed in the flow path.

The flow path pattern is patterned by photolithography, and the wafer is etched.

As the etching, the anisotropic wet etching using ICP-RIE or KOH can be used. The etching depth is about 300 µm, and the etching stops at an oxide layer. The nozzle configuration is normally a circular aperture configuration (not tapered) in the case of using ICP-RIE, and a rectangular aperture tapered configuration in the case of using the anisotropic wet etching. Recipe in the ICP-RIE is adjusted so as to slightly taper the nozzle or correct a mask pattern used in the wet etching, while taking the crystal surface into consideration, thereby enabling fabricating a nozzle similar to the circular aperture tapered nozzle. Also, two masks that are different in the opening area of the nozzle portion are used, and the etching is conducted by two stages, thereby enabling forming a narrow portion in the nozzle portion.

In this example, because the fuel is hydrogen, the pressure at the fuel inlet is 200 kPa, and the diameter of the nozzle is 125 µm, the flow rate can be controlled to 100 cc/min.

A photoresist of a thick film can be used as a mask for etching, or aluminum or silicon oxide can be used. In a case of using a plurality of masks, masks different in the kind can be used, or masks that are identical in the kind but different in the thickness can be used. After etching, the mask and the photoresist are removed.

Figure 17C:
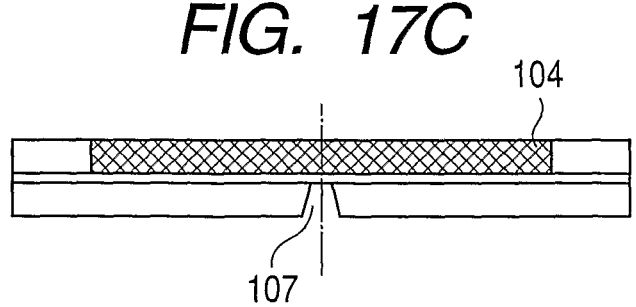

In a step illustrated in FIG. 17C, a diffusion flow path is formed. Masking is conducted, and anodization is conducted in a hydrogen fluoride solution, thereby enabling to form a porous diffusion flow path.

Figure 17D:
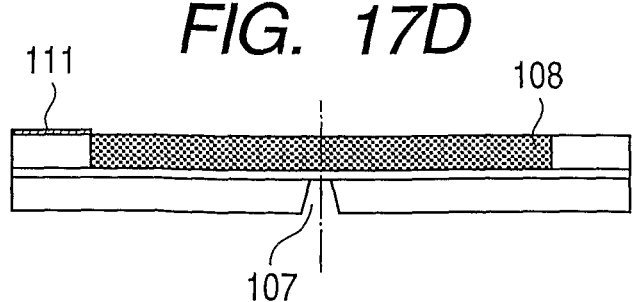

In a step illustrated in FIG. 17D, a catalyst layer and a wiring are formed. The catalyst can be made of Pt. The catalyst can be formed by sputtering or plating as well as coating slurry made of fine particles. The sputtering can be conducted under an inert gas such as normal argon or nitrogen. Alternatively, oxygen can be mixed during sputtering, thereby enabling to form a catalyst layer that is large in the surface area. Also, the wiring can be made of Au, and it is formed on a thin Cr layer using the sputtering or EB vapor deposition to obtain a good quality of film. It is preferable that the film is patterned by the lift off or the shadow mask using the photoresist.

Finally, the oxide layer of the mask and the nozzle portion is etched to complete the diluter.

The wiring 111 and the fuel sensor 109 are patterned by the lift off or the shadow mask using the photoresist.

The diluting mechanism illustrated in FIG. 4 is manufactured through the above respective processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-282183, filed Oct. 17, 2006, which is hereby incorporated by reference herein in its entirety.

The invention claimed is:

1. A diluting mechanism for an exhaust fuel that dilutes the concentration of the exhaust fuel in a dilution chamber, where the exhaust fuel is exhausted from a fuel cell, the diluting mechanism comprising:
    a fuel inlet constructed to receive exhaust fuel from an anode exhaust of the fuel cell and transmit the received exhaust fuel to the dilution chamber;
    a diluent inlet provided for supplying a diluent to the dilution chamber;
    a diffusion flow path provided in the dilution chamber for mixing the exhaust fuel that is supplied from the fuel inlet with the diluent that is supplied from the diluent inlet;
    a fuel exhaust port for exhausting the diluted exhaust fuel out of the dilution chamber through the diffusion flow path; and
    a nozzle that narrows a flow path, provided at the fuel inlet,
    wherein the nozzle limits a supply quantity of the exhaust fuel to the dilution chamber before the exhaust fuel comes into contract with the diluent, and
    wherein when a diameter of the nozzle is d and a purge flow rate of the exhaust fuel that is exhausted from the fuel cell is Q, a relationship between the purge flow rate Q and the diameter d is set to meet formula:

$$Q = \pi d^2 (2/(\kappa+1))^{1/(\kappa-1)} \times \{2/(\kappa+1)\}^{1/2} \rho v / 4$$

where κ is a specific heat ratio of the exhausted fuel, ρ is a density of the exhaust fuel at an upstream side of the nozzle, and v is the speed of sound.

2. The diluting mechanism for an exhaust fuel according to claim 1, wherein one of a flow path width and a depth of the diffusion flow path is smaller than a quenching distance of the exhaust fuel.

3. The diluting mechanism for an exhaust fuel according to claim 1, wherein the diluent inlet is located on an opposite side of the fuel inlet with respect to the diffusion flow path.

4. The diluting mechanism for an exhaust fuel according to claim 1, wherein the diluent inlet is constituted as an air supply port that supplies air that is the diluent, and the air supply port can take in the air due to natural diffusion.

5. The diluting mechanism for an exhaust fuel according to claim 4, wherein the diluent inlet serves as the fuel exhaust port.

6. The diluting mechanism for an exhaust fuel according to claim 1, further comprising a combustion catalyst provided in the diffusion flow path for reacting the exhaust fuel with the diluent.

7. The diluting mechanism for an exhaust fuel according to claim 6, wherein the combustion catalyst comprises any one of platinum, palladium, and a compound containing one of platinum and palladium.

8. The diluting mechanism for an exhaust fuel according to claim 6, further comprising a detector for detecting an electric resistance of the combustion catalyst.

9. The diluting mechanism for an exhaust fuel according to claim 1, further comprising:
    apart from a first fuel flow path that connects the device using the fuel with the fuel inlet, a second fuel flow path for supplying the exhaust fuel to the diffusion flow path from the device using the fuel; and
    a control valve provided in the second fuel flow path for controlling the supply quantity of the exhaust fuel to the dilution chamber.

10. The diluting mechanism for an exhaust fuel according to claim 1, further comprising a control valve provided between the device using the fuel and the fuel inlet, for controlling the supply quantity of the exhaust fuel to the dilution chamber.

11. The diluting mechanism for an exhaust fuel according to claim 10, further comprising a buffer region provided between the control valve and the fuel inlet, for limiting the supply quantity of the exhaust fuel, which is supplied to the dilution chamber, to a constant quantity.

12. The diluting mechanism for an exhaust fuel according to claim 10, wherein the control valve is opened when a downstream pressure becomes lower than a first set pressure that is equal to or higher than an outside atmospheric pressure and equal to or lower than a fuel pressure of the device using the fuel, and closed when the downstream pressure exceeds a second set pressure that is higher than the first set pressure.

13. The diluting mechanism for an exhaust fuel according to claim 9, further comprising a combustion catalyst provided in the diffusion flow path for reacting the exhaust fuel wuth the diluent and a detector for detecting an electric resistance of the combusation catalyst, wherein the control valve is controlled to be opened when an electric resistance that is detected by the detector becomes lower than a set value, and closed when the electric resistance exceeds the set value.

14. The diluting mechanism for an exhaust fuel according to claim 1, wherein the device using the fuel is located within a casing, and an air within the casing is taken into the dilution chamber from the diluent inlet.

15. The diluting mechanism for an exhaust fuel according to claim 14, wherein the diluting mechanism is placed at a portion higher than the device using the fuel within the casing in which the device using the fuel is located.

16. The diluting mechanism for an exhaust fuel according to claim 14, wherein the fuel exhaust port serves as an air hole for taking in the air to the device.

17. The diluting mechanism for an exhaust fuel according to claim 1, wherein the device using the fuel has a fuel tank, and the fuel that is emitted from a pressure relief valve of the fuel tank is taken in from one of the fuel inlet and the diluent inlet.

18. A fuel cell system that is equipped with the diluting mechanism for an exhaust fuel according to claim 1 as the purge gas processing device of the fuel cell.

* * * * *